(12) United States Patent
Chien et al.

(10) Patent No.: US 8,532,684 B2
(45) Date of Patent: Sep. 10, 2013

(54) INTERFERENCE REDUCTION APPARATUS AND INTERFERENCE REDUCTION METHOD THEREOF

(75) Inventors: Chun-Che Chien, Taipei (TW); Tsung-Yu Tsai, Shanhua Town (TW); Yi-Ting Lin, Yonghe (TW)

(73) Assignee: Institute for Information Industry, Taipei (TW)

( * ) Notice: Subject to any disclaimer, the term of this patent is extended or adjusted under 35 U.S.C. 154(b) by 446 days.

(21) Appl. No.: 12/978,060

(22) Filed: Dec. 23, 2010

(65) Prior Publication Data

US 2011/0218001 A1 Sep. 8, 2011

Related U.S. Application Data

(60) Provisional application No. 61/310,714, filed on Mar. 5, 2010.

(51) Int. Cl.
*H04Q 7/20* (2006.01)

(52) U.S. Cl.
USPC ........ 455/501; 455/500; 455/67.11; 455/517; 455/505; 455/426.1; 370/310; 370/328; 370/329; 370/343; 370/338

(58) Field of Classification Search
USPC ............. 455/501, 500, 517, 67.11, 505, 506, 455/507, 508, 509, 512, 514, 515, 67.13, 455/67.16, 422.1, 403, 550.1, 575.1, 426.1, 455/426.2, 423–425; 370/310, 328, 329, 370/343, 338
See application file for complete search history.

(56) References Cited

U.S. PATENT DOCUMENTS

2010/0273514 A1* 10/2010 Koo et al. .................. 455/501
2012/0108278 A1* 5/2012 Kim et al. .................. 455/501

* cited by examiner

*Primary Examiner* — Keith Ferguson
(74) *Attorney, Agent, or Firm* — Skaar Ulbrich Macari, P.A.

(57) ABSTRACT

The present invention relates to an interference reduction apparatus, an interference reduction method and a computer storage medium. The interference reduction apparatus can estimates the channel of the cells comprehensively to obtain the combination information and the interference power level information. The combination information and the interference power level information is used to combine at least one precoding matrix of he codebook with each other to generate a combined precoding matrix which acts as the strongest signal power from the interference reduction apparatus and the weakest interference from the neighboring cells.

18 Claims, 2 Drawing Sheets

US 8,532,684 B2

INTERFERENCE REDUCTION APPARATUS AND INTERFERENCE REDUCTION METHOD THEREOF

PRIORITY

This application claims the benefit of U.S. Provisional Application Ser. No. 61/310,714 filed on Mar. 5, 2010, which is hereby incorporated by reference in its entirety.

FIELD

The present invention relates to an interference reduction apparatus and an interference reduction method thereof. Specifically, the present invention relates to an interference reduction apparatus and an interference reduction method thereof for generating a combined pre-coding matrix index.

BACKGROUND

When a mobile station (MS) is in the cell-edge region, it may be able to receive signals from multiple base stations (BSs) and the MS's transmission may be received at multiple BSs regardless of the traffic load. To avoid inter-cell-interference, if the multiple BSs are coordinated, the downlink or uplink performance can be increased significantly. Therefore, the inter-BS cooperation technique in 4G, which is called multicell MIMO (multi-BS MIMO) in WiMAX and Coordinated Multi-Point transmission/reception (CoMP) in 3GPP are presented in their respective specification.

In cell-based MIMO downlink communications, it is necessary to design precoding matrices that are able to suppress inter-cell-interference to other cell users. Multi-BS MIMO technique, which improves sector throughput and cell-edge throughput through multi-BS cooperation, can alleviate the effect of inter-cell-interference based on precoding matrix coordination. For codebook-based feedback, MS finds Preferred Matrix Indexes (PMIs) from the codebook, one of which acts as the strongest signal power from the serving base station (serving BS) and the others are PMIs which act as the weakest interference from the neighboring BSs. Then based on the feedback of PMIs from MSs to their respective serving BSs, the inter-cell interference can be mitigated by coordinating the precoders applied in neighboring cells via backhaul signaling.

In the conventional precoder selection criteria, the candidates for PMI selection set at MSs are restrained according to inter-BS's negotiation, hence prevent the inter-cell-interference. However, the selection of PMI will be confined to the pre-defined codebook.

In summary, a need exists in the art to provide a solution that can effectively and flexibly prevent the inter-cell-interference, so as to improve the communication quality of the multi-input multi-output network.

SUMMARY

An objective of certain embodiments of the invention is to provide an interference reduction apparatus for use in a first cell adapted for a multi-input multi-output (MIMO) network. The MIMO network comprises a second cell and a third cell adjacent to the first cell. The first cell comprises an operation apparatus communicating with the interference reduction apparatus via a first serving channel and estimates the first serving channel, at least one second interfering channel of the second cell and at least one third interfering channel of the third cell to generate a first feedback signal according to a first codebook of the operation apparatus. The first feedback signal comprises first preferred matrix index (PMI) selection information and first combination information. The second cell shares a second feedback signal comprising second PMI selection information and second combination information with the first cell through a backhaul network. The third cell shares a third feedback signal comprising third PMI selection information and third combination information with the first cell through a backhaul network.

The interference reduction apparatus comprises a transceiver, a storage and a processor electrically connected to the storage and the transceiver. The transceiver is configured to receive the first feedback signal from the first serving channel, receive the second feedback signal and the third feedback signal from the backhaul network directly. The processor retrieved the first combination information and the first PMI selection information from the first feedback signal, retrieve the second combination information and the second PMI selection information from the second feedback signal, retrieve the third combination information and the third PMI selection information from the third feedback signal. The storage is configured to store a second codebook. The processor is configured to combine at least one precoding matrix of the second codebook with each other according to the first combination information, the first PMI selection information, the second PMI selection information, the second combination information, the third PMI selection information and the third combination information to generate a combined precoding matrix. The transceiver is further configured to proceed with a signal transmission with the operation apparatus according to the combined precoding matrix, and share the first combination information and the first PMI information with the second cell and the third cell.

Another objective of certain embodiments of the invention is to provide an interference reduction method for use in an interference reduction apparatus adapted for a first cell of an MIMO network. The MIMO network comprises a second cell and a third cell adjacent to the first cell. The first cell comprises an operation apparatus communicating with the interference reduction apparatus via a first serving channel and estimates the first serving channel, at least one second interfering channel of the second cell and at least one third interfering channel of the third cell to generate a first feedback signal according to a first codebook of the operation apparatus. The first feedback signal comprises first preferred matrix index (PMI) selection information and first combination information. The second cell share a second feedback signal comprising second PMI selection information and second combination information with the first cell. The third cell shares a third feedback signal comprising third PMI selection information and third combination information with the first cell. The interference reduction apparatus comprises a transceiver, a storage and a processor, the processor being electrically connected to the storage and the transceiver. The storage stores a second codebook.

The interference reduction method according to one embodiment comprises the following steps of: (a) enabling the transceiver to receive the first feedback signal, the second feedback signal and the third feedback signal; (b) enabling the processor to retrieve the first combination information and the first PMI selection information from the first feedback signal; (c) enabling the processor to retrieve the second combination information and the second PMI selection information from the second feedback signal; (d) enabling the processor to retrieve the third combination information and the third PMI selection information from the third feedback signal; (e) enabling the processor to combine at least one precoding matrix of the second codebook with each other according to the first combination information, the first PMI selection information, the second PMI selection information, the second combination information, the third PMI selection information and the third combination information to generate a combined precoding matrix; (f) enabling the transceiver to proceed a signal transmission with the operation apparatus according to the combined precoding matrix; and (g) enabling the transceiver to share the first combination information and the first PMI information with the second cell and the third cell.

In summary, the present invention can estimate the channel of the Cells comprehensively to obtain the combination information, such as the interference power level corresponding to selected PMI. The combination information is used to combine at least one precoding matrix of he codebook with each other to generate a combined precoding matrix which acts as the strongest signal power from the interference reduction apparatus of the serving cell (i.e. the first cell) and the weakest interference from the interference reduction apparatuses of the neighboring cells (i.e. the second and third cells). Thereby, the inter-cell-interference can be reduced effectively and flexibly.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to various example embodiments; nevertheless, these example embodiments are not intended to limit the present invention to any specific example, embodiment, environment, applications, or particular implementations described in these example embodiments. Therefore, descriptions of these example embodiments are only provided for purpose of illustration but not to limit the present invention. It should be appreciated that elements unrelated directly to the present invention are omitted from the embodiments and the attached drawings.

Before explaining the present invention, the multi-input multi-output (MIMO) network will be introduced first. In general, the MIMO network comprises a plurality of cells, each of which comprises a base station (BS) and at least one mobile station (MS). If the BS is providing a service to the MS via a serving channel, the BS is called as a serving BS. If the MS is receiving a service via a serving channel, the MS is called as a serving MS. In such cell-base communication, there is the overlap between the cell edges of two cells, and the inter-cell-interference occurs accordingly. In the following embodiments, the BS is considered as an interference reduction apparatus and the MS is considered as an operation apparatus in the downlink. The BS is considered as an operation apparatus and the MS is considered as an interference reduction apparatus in the uplink.

Figure 1:
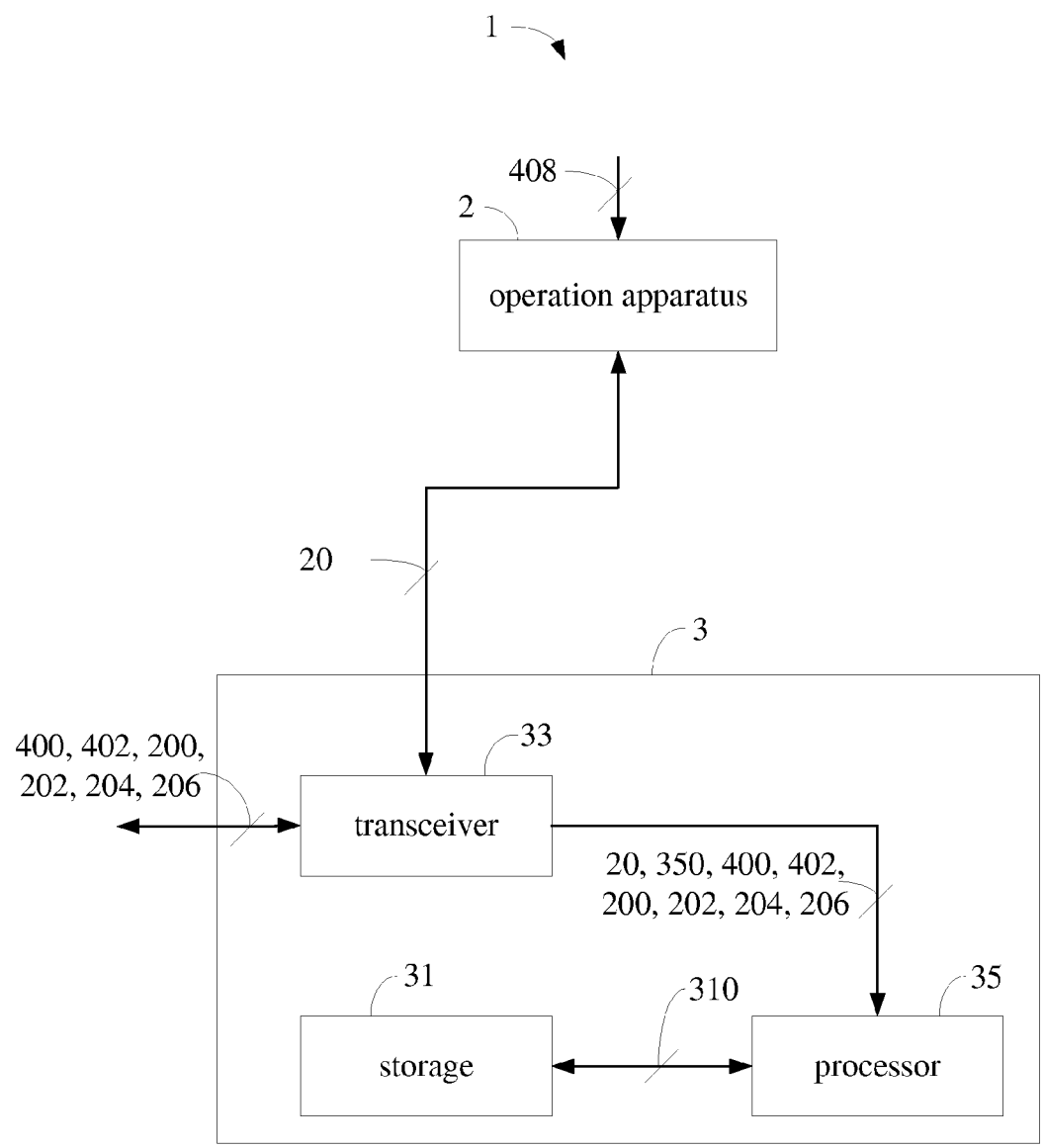
FIG. 1 illustrates a first embodiment of the present invention.

A first embodiment of the present invention is shown in FIG. 1, which illustrates the first cell 1 adapted for the MIMO network. The MIMO network comprises a second cell and a third cell adjacent to the first cell. The second cell shares a second feedback signal 400 comprising the second PMI selection information and the second combination information with the first cell 1, the third cell share a third feedback signal 402 comprising the third PMI selection information and the third combination information with the first cell 1.

In view of FIG. 1, the first cell 1 comprises an operation apparatus 2 and an interference reduction apparatus 3 which can communicate with each other via a first serving channel. The operation apparatus 2 can store a first codebook and estimate the first serving channel, at least one second interfering channel of the second cell and at least one third interfering channel of the third cell to generate a first feedback signal 20 according to the first codebook.

The first feedback signal 20 comprises the first combination information 200 and the first PMI selection information 202.

The interference reduction apparatus 3 comprises a storage 31, a transceiver 33 and a processor 35. The processor 35 is electrically connected to the storage 31 and the transceiver 35. The storage 31 is configured to store a second codebook 310 which records at least one precoding matrix. It should be noted that the precoding matrixes recorded in the second codebook 310 is defined in the conventional art and not described again.

After the operation apparatus 2 finishes the estimation and generates the first feedback signal 20, the transceiver 33 of the interference reduction apparatus 3 is configured to receive the first feedback signal 20, the second feedback signal 400 and the third feedback signal 402. Then the processor 35 of the interference reduction apparatus 3 is configured to retrieve the first combination information 200 and the first PMI selection information 202 from the first feedback signal 20, retrieve the second combination information and the second PMI selection information from the second feedback signal 400 and retrieve the third combination information and the third PMI selection information from the third feedback signal 402.

Then the processor 35 combines at least one precoding matrix of the second codebook 310 with each other according to the first combination information 200, the first PMI selection information 202, the second PMI selection information and the second combination information, the third PMI selection information and the third combination information to generate a combined precoding matrix 350.

It should be noted that in the uplink case, since the operation apparatus 2 is a BS, it may receive information 408 which indicates the estimation about the interfering channel(s) of the second cell and/or the third cell. The information 408 may comprise the second PMI selection information, the second combination information, the third PMI selection information and the third combination information, or comprises a second channel information of the second cell and a third channel information of the third cell. After receiving the information 408, the operation apparatus 2 may generate the first combination information 200 and the first PMI selection information 202 of the feedback signal 20 according to the information 408 and an estimation of the first serving channel The processor 35 combines at least one precoding matrix of the second codebook 310 with each other according to the first combination information 200 and the first PMI selection information 202 to generate the combined precoding matrix 350. In this case, the second PMI selection information, the second combination information, the third PMI selection information and the third combination information can be omitted.

Furthermore, the interference reduction apparatus 3 may obtain the information, which is needed in the process of combining at least one precoding matrix of the second codebook 310 with each other, by the other ways. For example, the processor 35 may directly sound the first serving channel of the operation apparatus 2 and at least one interfering channel of the second cell and the third cell to obtain the first combination information 200, the first PMI selection information 202, the second PMI selection information and the second combination information, the third PMI selection information and the third combination information.

Moreover, if there is the second serving channel in the first cell 1, the processor 35 of the interference reduction apparatus 3 can directly sound the second serving channel to obtain the fourth PMI selection information 204 and fourth combination information 206. Then the processor 35 of the interference reduction apparatus 3 combines the at least one precoding matrix of the second codebook 310 with each other according to the first combination information 200, the first PMI selection information 202, the second PMI selection information, the second combination information, the third PMI selection information, the third combination information, the fourth PMI selection information 204 and the fourth combination information 206 to generate the combined precoding matrix 350.

Besides, the processor 35 may directly sound the first serving channel, the at least one second interfering channel and at least one third interfering channel to obtain the first PMI selection information 202, the second PMI selection information and the third PMI selection information, and the processor 35 retrieves the first combination information 200, the second combination information and the third combination information from the first feedback signal 20, the second feedback signal 400 and the third feedback signal 402 respectively.

Also, the processor 35 may directly sound the first serving channel, the at least one second interfering channel and at least one third interfering channel to obtain the first combination information 200, the second combination information and the third combination information, and the processor 35 retrieves the first PMI selection information 202, the second PMI selection information and the third PMI selection information from the first feedback signal 20, the second feedback signal 400 and the third feedback signal 402 respectively.

Basically, there are two architectures to obtain the above PMI selection information and combination information: one is the feedback architecture and the other is the sounding architecture. In the feedback architecture, the interference reduction apparatus 3 can obtain the PMI selection information and combination information via another apparatus or source, such as the operation apparatus 2, the second cell, the third cell and so on. In the sounding architecture, the interference reduction apparatus 3 can obtain the PMI selection information and combination information by directly sounding the serving channel and the interfering channels of the second cell and the third cell. In practice, the feedback architecture and the sounding architecture can be used reciprocally. For example, the first and second PMI selection information and combination information can be obtained by the feedback architecture, and the third and fourth PMI selection information and combination information can be obtained by the sounding architecture.

The transceiver 33 is further configured to determine a transmission power according to the combined precoding matrix 350 to proceed a signal transmission with the operation apparatus 2, and share the combination information and the PMI selection information with the BSs of the second and third cells so that the BSs of the second and third cells work on the shared combination information and the shared PMI selection information.

Specifically, if the calculation of the combined precoding matrix 350 is for downlink, it is made by combining the part or all of the selected precoding matrixes enumerated in the downlink codebook for downlink multi-BS MIMO based on the above combination information and the PMI selection information. The combined precoding matrix 350 will make the signal transmitted from the interference reduction apparatus 3 (i.e. the serving BS) has the maximum signal power to the signal to the serving MS of the first cell and has the minimum interference power to other MSs in the second and the third cells.

If the calculation of the combined precoding matrix 350 is for uplink, it is made by combining the part or all of the selected precoding matrixes enumerated in the uplink codebook for uplink multi-BS MIMO based on the above combination information and the PMI selection information. The combined precoding matrix 350 will make the from the interference reduction apparatus 3 (i.e. the serving MS) has the maximum signal power to transmit the signal to the serving BS of the first cell but also has the minimum interference power to transmit the signal to the BSs of the second and third cells. How to select the precoding matrixes and combine the selected precoding matrixes will be described in the follows.

First, in the feedback architecture of uplink transmissions, the operation apparatus 2 (i.e. serving BS) of each cell selects some precoding matrixes from the codebook 310 to generate the PMI selection information according to the following equations:

$$W_{PMI_{max}} = \underset{W_i}{\mathrm{argmax}} \|H_s W_i\|^2$$

$$W_{PMI_{min}}(k) = \underset{W_i}{\mathrm{argmin}} \|H_k W_i\|^2$$

for each k∈BS in the second and third cells $W_{PMI_{max}}$ is the strongest signal power precoding matrix from the serving MS (i.e. interference reduction apparatus 3) to the serving BS of the first cell. $W_{PMI_{min}}(k)$ is the weakest interference power precoding matrix from the serving MS to the kth interfering BS in the second and third cells. $H_s$ and $H_k$ are the channel matrix from the serving MS (i.e. the interference reduction apparatus 3) to the serving BS of the first cell and the kth interfering BS in the second and third cells. The PMI selection information comprises the indexes of selected precoding matrixes.

Then, the processor 35 of the interference reduction apparatus 3 (i.e. serving MS) receive and combines the selected precoding matrixes with each other according to the PMI selection information and the combination information according to the following equations:

$$W = \frac{\alpha_0 W_{PMI_{max}} + \sum\limits_{k \in BS \ in \ Adjentcells} \alpha_k W_{PMI_{min}}(k)}{\left\| \alpha_0 W_{PMI_{max}} + \sum\limits_{k \in BS \ in \ Adjcentcells} \alpha_k W_{PMI_{min}}(k) \right\|},$$

$$0 \le \alpha_0, \alpha_k \le 1, \left(\alpha_0 + \sum_{k \in BS\ in\ Adjcentcells} \alpha_k\right) = 1$$

W is the combined precoding matrix. $\alpha_0$, $\alpha_k$ are weighting factors for the serving BS of the first cell and the kth interfering BS of the second and third cells. The power normalization of W, the range of $\alpha_0$, $\alpha_k$ between 0 and 1, and the total sum constraint indicated in above equation is just for ease of illustration. The determination of $\alpha_0$, $\alpha_k$ could be adjusted based on the combination information, such as interference power level information or relating in some way to the system/application considerations of the different cells.

Alternatively, the operation apparatus 2 (i.e. serving BS) of each cell selects two precoding matrixes from the codebook 310 to generate the PMI selection information according to the following equations:

$$W_{PMI_{max}} = \underset{W_i}{\mathrm{argmax}} \|H_s W_i\|^2$$

$$W_{PMI_{min}} = \underset{W_i}{\mathrm{argmin}} \sum_{k \in BS\ in\ Adjacent\ cells} \beta_k \|H_k W_i\|^2,$$

$$0 \le \beta_k \le 1, \sum_{k \in BS\ in\ Adjacent\ cells} \beta_k = 1$$

$W_{PMI_{max}}$ is the strongest signal power precoding matrix from MS to the serving BS in the first cell. $W_{PMI_{min}}$ is the weakest interference power precoding matrix which is jointly selected by coordinated BSs and causes minimum total interference from the serving MS to all interfering BSs in the second and third cells. $H_s$ and $H_k$ are the channel matrix from the serving MS (i.e. the interference reduction apparatus 3) to the serving BS of the first cell and the kth interfering BS in the second and third cells. $\beta_k$ is a weighting factor for the kth interfering BS in the second and third cells generated according to the interference power level information or relating in some way to the system/application considerations. The PMI selection information comprises the selected precoding matrixes.

Then, the processor 35 of the interference reduction apparatus 3 combines the selected precoding matrixes with each other according to the combination information, such as interference power level information or relating in some way to the system/application considerations of the different cells according to the following equations:

$$W = \frac{\alpha_1 W_{PMI_{max}} + (1 - \alpha_1) W_{PMI_{min}}}{\|\alpha_1 W_{PMI_{max}} + (1 - \alpha_1) W_{PMI_{min}}\|}, 0 \le \alpha_1 \le 1$$

W is the combined precoding matrix. $\alpha_1$ is the weighting factor for the serving BS of the first cell, the determination of $\alpha_1$ could be adjusted based on the interference power level information of the combination information or relating in some way to the performance considerations.

Alternatively, the operation apparatus 2 in each coordinated cells can jointly generates one selected precoding matrix without combination according to the interference power level information of the combination information based on the following equations:

$$W = \underset{W_i}{\mathrm{argmax}} \frac{\beta_1 \|H_s W_i\|^2}{\sum_{k \in BS\ in\ AdjcentCells} \beta_k \|H_k W_i\|^2}$$

$\beta_1$, $\beta_k$ could be adjusted based on the interference power level information of the combination information or relating in some way to the performance considerations. $H_s$ and $H_k$ are the channel matrix from the serving MS (i.e. the interference reduction apparatus 3) to the serving BS of the first cell and the kth interfering BS in the second and third cells.

Alternatively, the operation apparatus 2 in each coordinated cells can jointly generates one selected precoding matrix without combination according to the interference power level information of the combination information based on the following equations:

$$W = \underset{W_i}{\mathrm{argmax}} \frac{\beta_1 \|H_s W_i\|^2}{\sum_{k \in BS\ in\ AdjcentCells} \beta_k \|H_k W_i\|^2 + \beta_0 N_0}$$

$N_o$ is the receive background noise power at the serving BS or any noise or interference related value in consideration, $\beta_0$, $\beta_1$, $\beta_k$ could be adjusted based on the interference power level information or relating in some way to the performance consideration. $H_s$ and $H_k$ are the channel matrix from the serving MS (i.e. the interference reduction apparatus 3) to the serving BS of the first cell and the kth interfering BS in the second and third cells.

Figure 2:
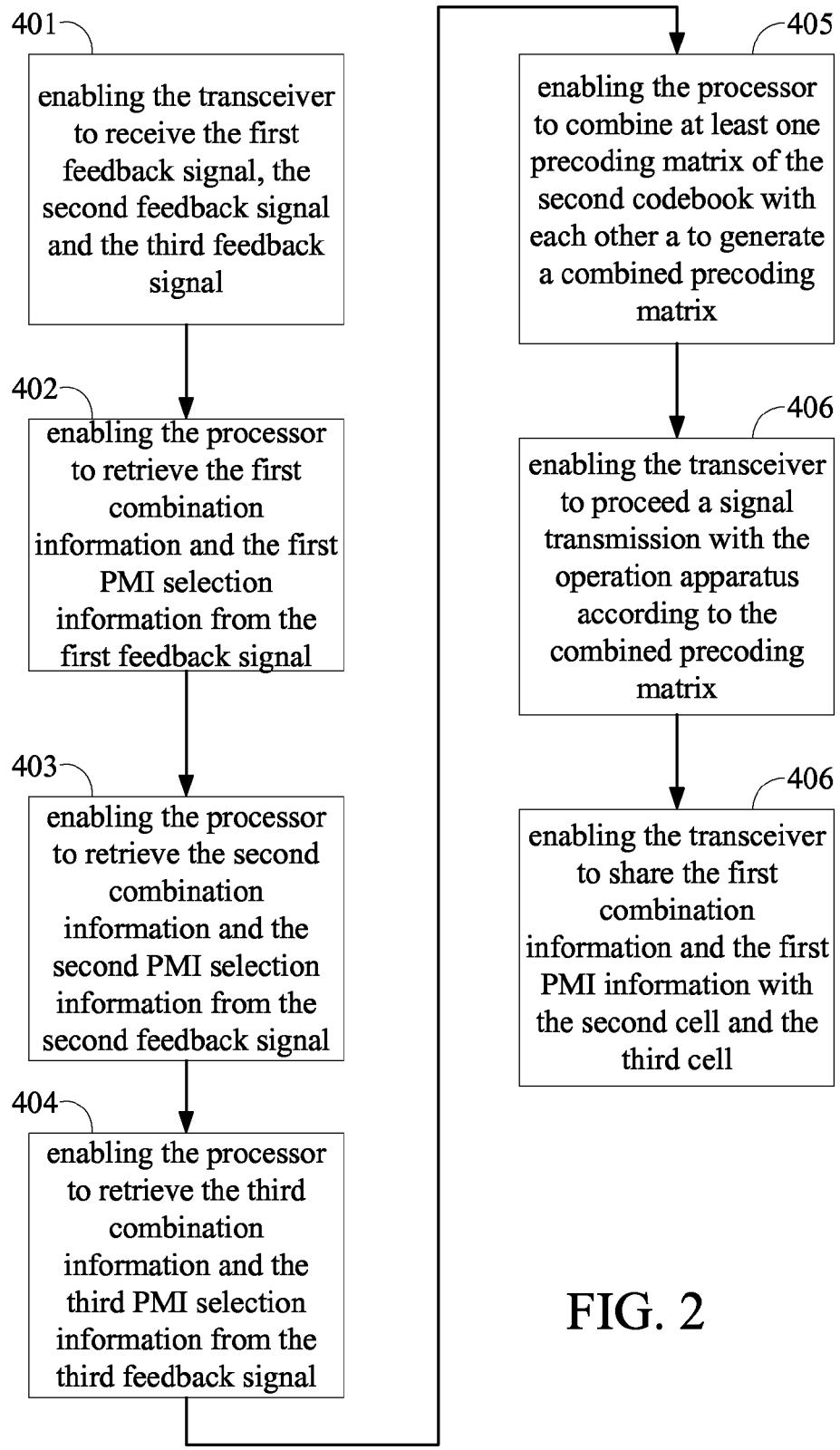
FIG. 2 illustrates a second embodiment of the present invention.

A second embodiment of the present invention is shown in FIG. 2, which illustrates an interference reduction method for use in an interference reduction apparatus as described in the first embodiment. The interference reduction apparatus is adapted for a first cell of an MIMO network comprising a second cell and a third cell adjacent to the first cell. The first cell comprises an operation apparatus communicating with the interference reduction apparatus via a first serving channel and estimates the first serving channel, at least one second interfering channel of the second cell and at least one third interfering channel of the third cell to generate a first feedback signal according to a first codebook of the operation apparatus.

The first feedback signal comprises first preferred matrix index (PMI) selection information and first combination information. The second cell shares a second feedback signal comprising second PMI selection information and second combination information with the first cell. The third cell shares a third feedback signal comprising third PMI selection information and third combination information with the first cell. The interference reduction apparatus comprises a transceiver, a storage and a processor, the processor being electrically connected to the storage and the transceiver. The storage is configured to store a second codebook.

First, step 401 is executed to enable the transceiver to receive the first feedback signal, the second feedback signal and the third feedback signal. Step 402 is executed to enable the processor to retrieve the first combination information and the first PMI selection information from the first feedback signal. Step 403 is executed to enable the processor to retrieve the second combination information and the second PMI selection information from the second feedback signal. Step 404 is executed to enable the processor to retrieve the third combination information and the third PMI selection information from the third feedback signal.

Step 405 is executed to enable the processor to combine at least one precoding matrix of the second codebook with each other according to the first combination information, the first PMI selection information, the second PMI selection information, the second combination information, the third PMI selection information and the third combination information to generate a combined precoding matrix.

Then, step 406 is executed to enable the transceiver to proceed with a signal transmission with the operation apparatus according to the combined precoding matrix. Step 407 is executed to enable the transceiver to share the first combination information and the first PMI information with the BSs of the second and third cells.

If there are two or more serving channels in the first cell, the interference reduction method further comprises a step of enabling the processor to directly sound a second serving channel to obtain a fourth PMI selection information and a fourth combination information, which is executed before the step 405. The step 405 is a step of enabling the processor to combine at least one precoding matrix of the second codebook with each other according to the first combination information, the first PMI selection information, the second PMI selection information, the second combination information, the third PMI selection information, the third combination information, the fourth PMI selection information and the fourth combination information to generate the combined precoding matrix.

In the uplink case, since the operation apparatus is a BS, it may receive the second combination information, the second PMI selection information, the third combination information and the third PMI selection information via backhaul network, and generate the first feedback signal according to the second combination information, the second PMI selection information, the third combination information, the third PMI selection information and an estimation of the first serving channel. Step 401 is a step of enable the transceiver to receive the first feedback signal, and steps 403 and 404 may be omitted accordingly. Step 405 is a step of enabling the processer to combine at least one precoding matrix of the second codebook with each other according to the first PMI selection information and the first combination information.

Furthermore, since the operation apparatus is a BS, it may receive a second channel information of the second cell and a third channel information of the third cell, and generate the first feedback signal according to an estimation of the first serving channel, the second channel information and the third channel information. Step 401 is a step of enable the transceiver to receive the first feedback signal, and steps 403 and 404 may be omitted accordingly. Step 405 is a step of enabling the processer to combine the least one precoding matrix of the second codebook with each other according to the first PMI selection information and the first combination information.

Basically, there are two architectures to obtain the above PMI selection information and combination information: one is the feedback architecture and the other is the sounding architecture. In practice, the feedback architecture and the sounding architecture can be used reciprocally to obtain the information which is needed in the process of combining at least one precoding matrix of the second codebook with each other. For example, the first and second PMI selection information and combination information can be obtained by the feedback architecture, and the third and fourth PMI selection information and combination information can be obtained by the sounding architecture. Some examples will be described in the following description.

Steps 401-404 may be replaced by the steps of enabling the processor to directly sound the first serving channel to obtain the first PMI selection information and the first combination information; enabling the processor to directly sound at least one interfering channel of the second cell to obtain the second PMI selection information and the second combination information; and enabling the processor to directly sound at least one interfering channel of the third cell to obtain the third PMI selection information and the third combination information.

In the first example, step 401 may be a step of enable the transceiver to receive the first feedback signal and the third feedback signal, and step 403 may be omitted. It is executed to enable the processor to directly sound the at least one second interfering channel to obtain the second PMI selection information and the second combination information before the step 405.

In the second example, steps 401-404 may be replaced by the steps of: enabling the processor to directly sounds the serving channel, the at least one second interfering channel and at least one third interfering channel to obtain the first PMI selection information, the second PMI selection information and the third PMI selection information; and enabling the processor to retrieve the first combination information, the second combination information and the third combination information from the first feedback signal, the second feedback signal and the third feedback signal respectively. After that, steps 405-407 can be executed.

In the third example, steps 401-404 may be replaced by the steps of: enabling the processor to directly sound the serving channel, the at least one second interfering channel and at least one third interfering channel to obtain the first combination information, the second combination information and the third combination information; and enabling the processor to retrieve the first PMI selection information, the second PMI selection information and the third PMI selection information from the first feedback signal, the second feedback signal and the third feedback signal respectively. After that, steps 405-407 can be executed.

In addition to the aforesaid steps, the second embodiment can also execute all the operations and functions set forth in the first embodiment, and adjust the steps of the interference reduction method. How the second embodiment executes these operations and functions will be readily appreciated by those of ordinary skill in the art based on the explanation of the first embodiment, and thus will not be further described herein.

Furthermore, the interference reduction method described in the second embodiment may be implemented by a computer storage medium. When the computer storage medium is loaded into the interference reduction apparatus, a plurality of codes contained in the computer storage medium is executed, the interference reduction method described in the second embodiment can be accomplished. This computer storage medium may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In summary, the present invention can estimate the channel of the cells comprehensively to obtain the combination information, such as the interference power level information. The combination information is used to combine at least one precoding matrix of he codebook with each other to generate a combined precoding matrix which acts as the strongest signal power from the interference reduction apparatus and the weakest interference from the neighboring cells. Thereby, the inter-cell-interference can be reduced effectively and flexibly.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An interference reduction apparatus for use in a first cell adapted for a multi-input multi-output (MIMO) network, the MIMO network comprising a second cell and a third cell adjacent to the first cell, the first cell comprising an operation apparatus communicating with the interference reduction apparatus via a first serving channel and estimating the first serving channel, at least one second interfering channel of the second cell and at least one third interfering channel of the third cell to generate a first feedback signal according to a first codebook of the operation apparatus, the first feedback signal comprising first preferred matrix index (PMI) selection information and first combination information, the second cell sharing a second feedback signal comprising second PMI selection information and second combination information with the first cell, the third cell sharing a third feedback signal comprising third PMI selection information and third combination information with the first cell, the interference reduction apparatus comprising:

a transceiver, being configured to receive the first feedback signal, the second feedback signal and the third feedback signal;

a storage, being configured to store a second codebook; and a processor, being electrically connected to the storage and the transceiver, and being configured to retrieve the first combination information and the first PMI selection information from the first feedback signal, retrieve the second combination information and the second PMI selection information from the second feedback signal, retrieve the third combination information and the third PMI selection information from the third feedback signal, and combine at least one precoding matrix of the second codebook with each other according to the first combination information, the first PMI selection information, the second PMI selection information, the second combination information, the third PMI selection information and the third combination information to generate a combined precoding matrix;

wherein the transceiver is further configure to proceed a signal transmission with the operation apparatus according to the combined precoding matrix, and share the first combination information and the first PMI information with the second cell and the third cell.

2. The interference reduction apparatus as claimed in claim 1, wherein the processor is further configured to directly sound the at least one second interfering channel to obtain the second PMI selection information and the second combination information, and combine the at least one precoding matrix of the second codebook with each other according to the first combination information, the first PMI selection information, the second PMI selection information, the second combination information, the third PMI selection information and the third combination information to generate the combined precoding matrix.

3. The interference reduction apparatus as claimed in claim 2, wherein the processor is further configured to directly sound the first serving channel, the at least one second interfering channel and the at least one third interfering channel to obtain the first PMI selection information and the first combination information, and combine the at least one precoding matrix of the second codebook with each other according to the first PMI selection information and the first combination information to generate the combined precoding matrix.

4. The interference reduction apparatus as claimed in claim 1, wherein the processor is further configured to directly sound a second serving channel to obtain a fourth PMI selection information and a fourth combination information, and combine at least one precoding matrix of the second codebook with each other according to the first combination information, the first PMI selection information, the second PMI selection information, the second combination information, the third PMI selection information, the third combination information, the fourth PMI selection information and the fourth combination information to generate the combined precoding matrix.

5. The interference reduction apparatus as claimed in claim 1, wherein each of the second cell and the third cell comprises a base station (BS), the transceiver is further configure to share the first combination information and the first PMI selection information with the BS of each of the second cell and the third cell.

6. The interference reduction apparatus as claimed in claim 1, wherein the operation apparatus further receives the second combination information, the second PMI selection information, the third combination information and the third PMI selection information, and generate the first feedback signal according to the second combination information, the second PMI selection information, the third combination information, the third PMI selection information and an estimation of the first serving channel, the processer further combines the least one precoding matrix of the second codebook with each other according to the first PMI selection information and the first combination information.

7. The interference reduction apparatus as claimed in claim 1, wherein the operation apparatus further receives a second channel information of the second cell and a third channel information of the third cell, and generate the first feedback signal according to an estimation of the first serving channel, the second channel information and the third channel information, the processor further combines the least one precoding matrix of the second codebook with each other according to the first PMI selection information and the first combination information.

8. The interference reduction apparatus as claimed in claim 1, wherein the processor further directly sounds the first serving channel, the at least one second interfering channel and at least one third interfering channel to obtain the first PMI selection information, the second PMI selection information and the third PMI selection information, the processor further retrieves the first combination information, the second combination information and the third combination information from the first feedback signal, the second feedback signal and the third feedback signal respectively.

9. The interference reduction apparatus as claimed in claim 1, the processor further directly sounds the first serving channel, the at least one second interfering channel and at least one third interfering channel to obtain the first combination information, the second combination information and the third combination information, the processor further retrieves the first PMI selection information, the second PMI selection information and the third PMI selection information from the first feedback signal, the second feedback signal and the third feedback signal respectively.

10. An interference reduction method for use in an interference reduction apparatus adapted for a first cell of an MIMO network, the MIMO network comprising a second cell and a third cell adjacent to the first cell, the first cell comprising an operation apparatus communicating with the interference reduction apparatus via a first serving channel and estimating the first serving channel, at least one second interfering channel of the second cell and at least one third interfering channel of the third cell to generate a first feedback signal according to a first codebook of the operation apparatus, the first feedback signal comprising first preferred matrix index (PMI) selection information and first combination information, the second cell sharing a second feedback signal comprising second PMI selection information and second combination information with the first cell, the third cell sharing a third feedback signal comprising third PMI selection information and third combination information with the first cell, the interference reduction apparatus comprising a transceiver, a storage and a processor, the processor being electrically connected to the storage and the transceiver, the storage storing a second codebook, the interference reduction method comprising the steps of:
  (a) enabling the transceiver to receive the first feedback signal, the second feedback signal and the third feedback signal;
  (b) enabling the processor to retrieve the first combination information and the first PMI selection information from the first feedback signal;
  (c) enabling the processor to retrieve the second combination information and the second PMI selection information from the second feedback signal;
  (d) enabling the processor to retrieve the third combination information and the third PMI selection information from the third feedback signal;
  (e) enabling the processor to combine at least one precoding matrix of the second codebook with each other according to the first combination information, the first PMI selection information, the second PMI selection information, the second combination information, the third PMI selection information and the third combination information to generate a combined precoding matrix;
  (f) enabling the transceiver to proceed a signal transmission with the operation apparatus according to the combined precoding matrix; and
  (g) enabling the transceiver to share the first combination information and the first PMI information with the second cell and the third cell.

11. The interference reduction method as claimed in claim 10, further comprising a step of enabling the processor to directly sound the at least one second interfering channel to obtain the second PMI selection information and the second combination information.

12. The interference reduction method as claimed in claim 11, further comprising a step of enabling the processor to directly sound the first serving channel, the at least one second interfering channel and the at least one third interfering channel to obtain the first PMI selection information and the first combination information, the step (e) is a step of enabling the processor to combine at least one precoding matrix of the second codebook with each other according to the first combination information and the first PMI selection information to generate the combined precoding matrix.

13. The interference reduction method as claimed in claim 10, further comprising a step of enabling the processor to directly sound a second serving channel to obtain a fourth PMI selection information and a fourth combination information, the step (e) is a step of enabling the processor to combine at least one precoding matrix of the second codebook with each other according to the first combination information, the first PMI selection information, the second PMI selection information, the second combination information, the third PMI selection information, the third combination information, the fourth PMI selection information and the fourth combination information to generate the combined precoding matrix.

14. The interference reduction method as claimed in claim 10, wherein each of the second cell and the third cell comprises a BS, the step (g) is a step of enabling the transceiver to share the combination information and the PMI selection information with the BS of each of the second cells so that the second cells operate according to the combination information and the PMI selection information.

15. The interference reduction method as claimed in claim 10, wherein the operation apparatus further receives the second combination information, the second PMI selection information, the third combination information and the third PMI selection information, and generate the first feedback signal according to the second combination information, the second PMI selection information, the third combination information, the third PMI selection information and an estimation of the first serving channel, the interference reduction method further comprises a step of enabling the processer to combine the least one precoding matrix of the second codebook with each other according to the first PMI selection information and the first combination information.

16. The interference reduction method as claimed in claim 10, wherein the operation apparatus further receives a second channel information of the second cell and a third channel information of the third cell, and generate the first feedback signal according to an estimation of the first serving channel, the second channel information and the third channel information, the interference reduction method further comprises a step of enabling the processor to combine the least one precoding matrix of the second codebook with each other according to the first PMI selection information and the first combination information.

17. The interference reduction method as claimed in claim 10, further comprising the steps of:
  enabling the processor to directly sounds the first serving channel, the at least one second interfering channel and at least one third interfering channel to obtain the first PMI selection information, the second PMI selection information and the third PMI selection information; and
  enabling the processor to retrieve the first combination information, the second combination information and the third combination information from the first feedback signal, the second feedback signal and the third feedback signal respectively.

18. The interference reduction method as claimed in claim 10, further comprising the steps of:
  enabling the processor to directly sound the first serving channel, the at least one second interfering channel and at least one third interfering channel to obtain the first combination information, the second combination information and the third combination information; and
  enabling the processor to retrieve the first PMI selection information, the second PMI selection information and the third PMI selection information from the first feedback signal, the second feedback signal and the third feedback signal respectively.

\* \* \* \* \*